United States Patent
Wong et al.

(10) Patent No.: US 11,775,999 B2
(45) Date of Patent: *Oct. 3, 2023

(54) REFERRAL MONETIZATION IN SOCIAL NETWORK

(71) Applicant: Lucas GC Limited, Hong Kong (HK)

(72) Inventors: Wang-Chan Wong, Irvine, CA (US); Howard Lee, Porter Ranch, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/817,730

(22) Filed: Aug. 5, 2022

(65) Prior Publication Data

US 2022/0383353 A1 Dec. 1, 2022

Related U.S. Application Data

(63) Continuation-in-part of application No. 17/121,554, filed on Dec. 14, 2020, now Pat. No. 11,443,393.

(51) Int. Cl.
- *G06Q 30/00* (2023.01)
- *G06Q 30/0214* (2023.01)
- *G06Q 50/00* (2012.01)

(52) U.S. Cl.
CPC ......... *G06Q 30/0214* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2002/0143682 A1* | 10/2002 | Bergmann | G06Q 40/10 705/36 T |
| 2009/0011971 A1 | 5/2009 | Lo | H04L 12/1859 |

(Continued)

FOREIGN PATENT DOCUMENTS

CN 110233833 5/2019

OTHER PUBLICATIONS

Chauhan; A_Blockchain-Based_Tracking_System; IEEE; pp. 111-115; 2020.*

(Continued)

*Primary Examiner* — Radu Andrei
(74) *Attorney, Agent, or Firm* — Helen Mao; Imperium Patent Works

(57) ABSTRACT

Methods and systems are provided for blockchain-based social media commerce referral tracking system (BRTS). In one novel aspect, the blockchain is used to support traceability and transparency for the referral tracking system that monitors transactions of one or more user generated contents (UGCs) with one or more actionable items. Traceability and transparency foster trust among participants. In one embodiment, the BRTS tracks transactions of a UGC, updates a UGC record upon detecting one or more predefined transactions at a receiving node, detects one or more exit transactions at an ending node, and adds a UGC tuple of transactions from the originator node to the ending node based on the UGC record to a blockchain database upon detecting the one or more exit conditions. In another embodiment, the UGC record is updated using a recursive push procedure. In one embodiment, the BRTS generates one or more referral rewards for each UGC tuple record based on a configured rewarding scheme.

19 Claims, 10 Drawing Sheets

(56) References Cited

U.S. PATENT DOCUMENTS

| | | | | |
|---|---|---|---|---|
| 2009/0119710 | A1* | 5/2009 | Lo | H04L 12/1859 |
| | | | | 725/39 |
| 2009/0196570 | A1* | 8/2009 | Dudas | G11B 27/034 |
| | | | | 709/206 |
| 2016/0180386 | A1* | 6/2016 | Konig | G06Q 30/0255 |
| | | | | 705/14.55 |
| 2016/0314501 | A1* | 10/2016 | Bartholomew | G06Q 30/0275 |
| 2017/0364936 | A1* | 12/2017 | Balfour | G06Q 20/204 |
| 2019/0026782 | A1* | 1/2019 | McGrath | G06F 16/9535 |
| 2020/0111186 | A1* | 4/2020 | Barkeloo | G06F 16/2379 |
| 2020/0297458 | A1* | 9/2020 | Roschin | G06F 40/10 |
| 2021/0118072 | A1* | 4/2021 | Liu | G06Q 50/12 |

OTHER PUBLICATIONS

Cui; A_Blockchain-Based_Framework_for_Supply_Chain_Provenance; ACCIESS; pp. pp. 157113-157125; 2019.*

Sheng; Near-Online_Tracking_With_Co-Occurrence_Constraints_in_Blockchain-Based_Edge_Computing; IEEE; pp. 2193-2207; 2021.*

* cited by examiner

TRANSACTION RECORD STRUCTURE

REFERRAL MONETIZATION IN SOCIAL NETWORK

CROSS REFERENCE TO RELATED APPLICATIONS

This application is a continuation-in-part and claims priority under 35 U.S.C. § 120 from nonprovisional U.S. patent application Ser. No. 17/121,554, entitled "THE BLOCKCHAIN-BASED REFERRAL TRACKING SYSTEM (BRTS)," filed on Dec. 14, 2020. The disclosure of each of the foregoing documents is incorporated herein by reference.

TECHNICAL FIELD

The present invention relates generally to referral system and, more particularly, a referral monetization in social network.

BACKGROUND

The explosive growth of social network provides people with a wide range of benefits. The members of the social network share a wide variety of information through the social media platform. People rely on the social network, also known as the social media network, to get more connected and get information faster. In recent years, the social media network has extended beyond casual networking among friends and families. The social media platform has increasingly gained applications for business and professional uses. In the marketing area, the traditional word-of-mouth (WOM) phenomenon has evolved into a new form of communication, namely, eWOM (electronic WOM). eWOM includes blogs, online reviews, social media posts, and messages posted on online groups. Opinion leader before social media on the Internet was difficult to come by. It was costly to grow and promote an OL because it had to go through the conventional media channels and/or word-of-mouth. In the Internet social media age, OL becomes a very viable and scalable concept. They can reach out to millions of listeners relatively easier. There are "celebrities" in social media. Some of them are celebrities in their own rights, such as artists, movie stars, athletes, etc. They are natural opinion leaders. Others find their ways to offer entertaining contents with writing, audio, and video, or to offer practical hands-on experiences, or to offer expert knowledge. They have followers very much like the traditional opinion leaders. Key opinion leader (KOL), also known as influencer, is what we call these opinion leaders in social media. Digital marketing can be monetized in two major forms: (1) conventional online advertising, and (2) eWOM in social media commerce. In conventional online advertising, the advertiser creates product or service hyperlinks, banner ads etc., and places them onto their affiliated partner's websites or social media pages. Showing the ads and/or clicking the hyperlinks will trigger events such as collecting the consumer's information, frequency of the clicks, the number of views, etc. Advertisers collect this information to justify their advertising effectiveness and to charge their clients accordingly. Affiliates, either companies who carry the hyperlinks on their web pages or individuals such as bloggers embedding the links in their blogs, will receive monetary rewards for their participation. However, the current online advertising lacks effectiveness. A study shows that 75% of people do not believe advertisements, while 92% believe recommendations from friends, and KOLs who they are following. With the expected further growth in social media commerce, eWOM through online referral sees great growth opportunities.

Improvements and enhancements are required to use a more efficient way to provide social media referral marketing.

SUMMARY

Methods and systems are provided for blockchain-based referral tracking system (BRTS). In one novel aspect, a blockchain is used to support traceability and transparency for the referral tracking system that tracking transactions of one or more user generated contents (UGCs) with one or more actionable items. Traceability and transparency foster trust among participants. In one embodiment, the BRTS tracks transactions of a user generated content (UGC), wherein the UGC propagates from an originator node through multiple receiving nodes in a social media network, and wherein the UGC comprises one or more actionable items, updates a UGC record upon detecting one or more predefined transactions at a receiving node, wherein the UGC record comprising at least a transaction history from the originator node to the receiving node, detects one or more exit transactions at an ending node, and adds a UGC tuple of transactions from the originator node to the ending node based on the UGC record to a blockchain database upon detecting the one or more exit conditions. In one embodiment, the one or more predefined transactions comprise pushing the UGC to one or more receiving nodes, acting on the one or more actionable items, and an expiration of a no-action timer. In another embodiment, the one or more exit conditions comprise the ending node completing acting on the one or more actionable items, the ending node acting on an expired actional item, a number of times the ending node acting on the one or more actionable items exceeds a predefined maximum action number, no transaction at the ending node upon an expiration of a no-action timer, and the ending node is the originator node. In one embodiment, each transaction in the UGC record is associated with a timestamp indicating a time of the transaction. In another embodiment, the UGC record is updated using a recursive push procedure with inputs of a pushing node, a recipient node, and a payload. In one embodiment, the BRTS generates one or more referral rewards for each UGC tuple record based on a configured rewarding scheme. In another embodiment, the configured reward scheme is generated and updated through a user interface by user inputs. In one embodiment, the BRTS retrieves one or more UGC tuple records from the blockchain database upon detecting one or more user requests. In another embodiment, the UGC is generated using a convolutional neural network (CNN) model based on one or more promotional objects. In one embodiment, the BRTS identifies one or more key opinion leaders (KOLs) as originator nodes for the UGC using a convolutional neural network (CNN) model based on one or more promotional objects. In another embodiment, the one or more KOLs and corresponding promotional objects are recorded in a private interplanetary file system (IPFS) that interacts with the blockchain database.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

The social media platform provides members to build or join online communities, get information, interact with each other, and share information. With the exponential growth of the social network, social media influencers are thriving. A social media influencer, aka Key Opinion Leader (KOL), through his/her presence on the social media platform, has gained and established credibility in one or more specific industry taxonomies. As members of the social media network share information to the public or one or more online communities, a group of members build their reputation and gain trust for their knowledge and expertise in one or more industry taxonomies. These members grow their number of followers on the social media network and wield their influence through social media. The KOLs and their followers build an effective network for social media marketing like that of word-of-mouth. However, tracking and recording as the promotional materials propagate the social media network requires transparency, accuracy, and traceability. The blockchain-based tracking referral system (BRTS) provides efficiency, transparency, and traceability for social media commerce marketing.

Figure 1:
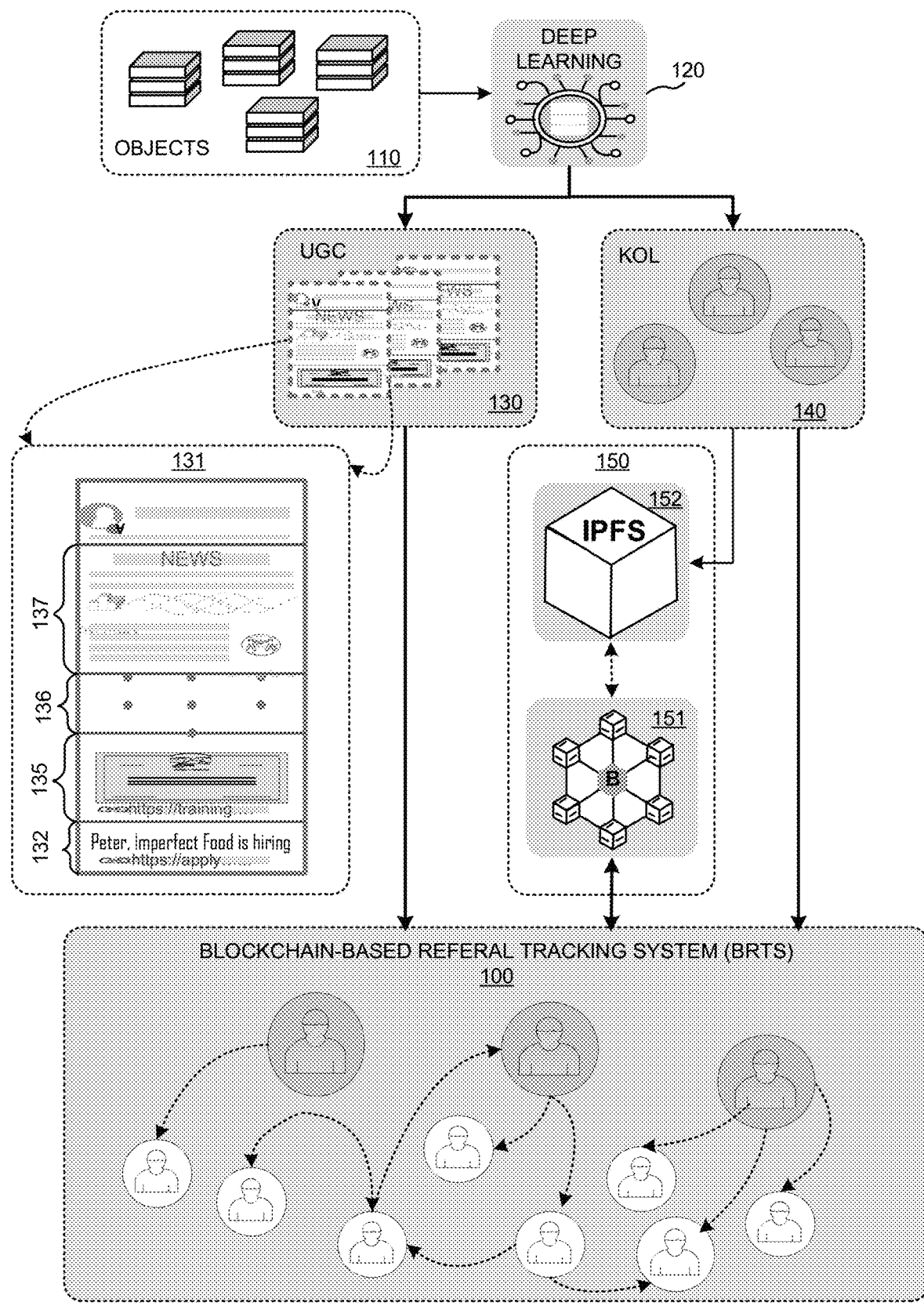
FIG. 1 illustrates exemplary diagrams for a blockchain-based referral tracking system (BRTS) in accordance with embodiments of the current invention.

FIG. 1 illustrates exemplary diagrams for a blockchain-based referral tracking system (BRTS) in accordance with embodiments of the current invention. A BRTS system 100 gets a set of user generated contents (UGC) 130. The set of UGCs are published through a group of KOL 140 and propagated in a social media network. UGC 130 are generated based on a set of promotional objects 110. In one embodiment, one or more UGCs are generated using a deep learning/data mining 120 on domain-specific big data. In one embodiment, KOL 140 are obtained using a deep learning/data mining 120 on domain-specific big data. Once the UGCs are published, each UGC with one or more promotional items propagates through the social media network. BRTS system 100 tracks UGC, updates corresponding records, and upon detecting exit conditions, adds the record to the database 150. In one embodiment, database 150 includes a blockchain database 151 and a private interplanetary file system (IPFS) 152.

In one embodiment, a group of KOL 140 is identified based on one or more promotional items, such as object 110. In one embodiment, a group of KOLs are identified using a deep learning convolutional neural network (CNN) model. A domain specific learning model, such as the CNN model, is developed based on each promotional item/object. Each identified KOL is associated with one or more promotional items. Each promotional item is associated with one or more KOLs.

In one embodiment, one or more UGCs 130 are generated for each promotional item. In recent years, it is proven that a KOL delivering an eWOM message to his/her followers is an effective way to push products and services. Many studies support the idea of using user generated content (UGC) as eWOM. Social posts, images and videos from real people are popular with user-generated content (UGC). The combination of KOL and UGC becomes a powerful marketing tool to promote products and services. The UGC for promotional purposes includes one or more actionable items associated with one or more promotional items. An exemplary UGC 131 is published by a KOL and pushed to the KOL's community of followers. For example, UGC 131 includes a personalized industry news 137, a first personalized new product or service announcement 135, and a second promotional product/service announcement 132. Other personalized contents 136 can also be included, such as personalized columns and articles that are known to draw interest in the KOL's community readers. In one embodiment, the personalized contents, such as those in 132, 135, 136 and 137 are generated based on one or more attributes of one or more promotional objects using a CNN deep learning model.

In one embodiment, BRTS 100 also includes a storage system 150. In one embodiment, storage system 150 is part of BRTS 100. In another embodiment, BRTS 100 includes interface modules to interact with storage system 150. Storage system 150 for BRTS includes two storage technologies, a blockchain distributed ledger 151 and a private Interplanetary file system (IPFS) 152. In one embodiment, information of KOL 140 is stored in IPFS 152. BRTS 100 updates UGC transaction records in blockchain database 151.

Figure 2:
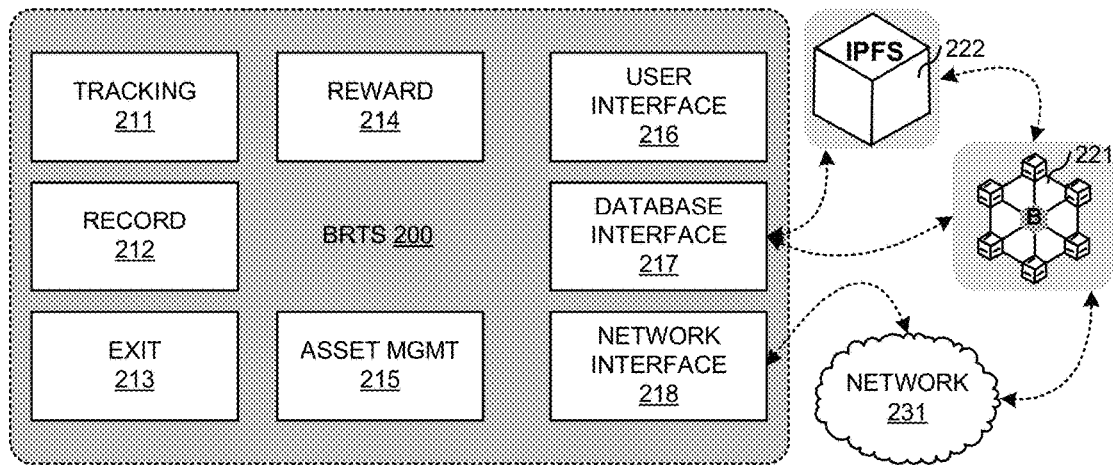
FIG. 2 illustrates an exemplary block diagram of functional modules of a blockchain-based referral tracking system in accordance with embodiments of the current invention.

FIG. 2 illustrates an exemplary block diagram of functional modules of a blockchain-based referral tracking system in accordance with embodiments of the current invention. BRTS 200 comprising a tracking module 211, a record module 212, an exit module 213, a database interface 217, and a network interface 218. In other embodiments, BRTS 200 further includes one or more modules comprising a reward module 214, an asset management module 215, and a user interface 216. In one embodiment, BRTS 200 also includes database modules, including a blockchain database 221, and a IPFS 222. Tracking module 211 tracks transactions of a user generated content (UGC), wherein the UGC propagates from an originator node through multiple receiving nodes in a social media network, and wherein the UGC comprises one or more actionable items. Record module 212 updates a UGC record upon detecting one or more predefined transactions at a receiving node, wherein the UGC record comprising at least a transaction history from the originator node to the receiving node. Exit module 213 detects one or more exit transactions at an ending node. Reward module 214 generates one or more referral rewards for each UGC tuple record based on a configured rewarding scheme. Asset management module 215 stores and retrieves one or more UGC tuple records from the blockchain database and the actual assets from the IPFS upon detecting one or more user requests. User interface module 216 takes input from user devices and sends outputs to one or more user devices. Database interface module 217 adds a UGC tuple of transactions from the originator node to the ending node based on the UGC record to a blockchain database upon detecting the one or more exit conditions. 217 also works with Asset Management 215 to store and retrieve assets from IPFS. The hash addresses of the assets are stored in blockchain 221. Network interface module 218 connects BRTS with a network 231. In one embodiment, network 231 is a social media network. In other embodiments, the BRTS modules and components run one or more processors or run on different network-connected devices and communicate with each other via predefined network messages. In other embodiments, the functions can be implemented in software, firmware, hardware, or any combinations.

In a social media commerce marketing referral eco system, traditionally, the only person who is rewarded monetarily is the KOL. In a social media network, the promotional items can propagate several layers of followers. To reward the followers efficiently encourages the participation of propagations of the marketing materials and benefits the KOL as the community of the KOL expands beyond the direct followers. With the popularity of sharing economy, BRTS offers people in the community an opportunity not only to share the funs of the UGC but also the wealth. By dismantling the one-way top-down word-of-mouth, a follower can be an advocate and evangelist and use her own network to further promote the products and services, and, at the same time, gets monetary reward. Moreover, she may have a chance to become a KOL and grow her network if she chooses to. It will be a win-win situation for the KOL and her followers.

Figure 3:
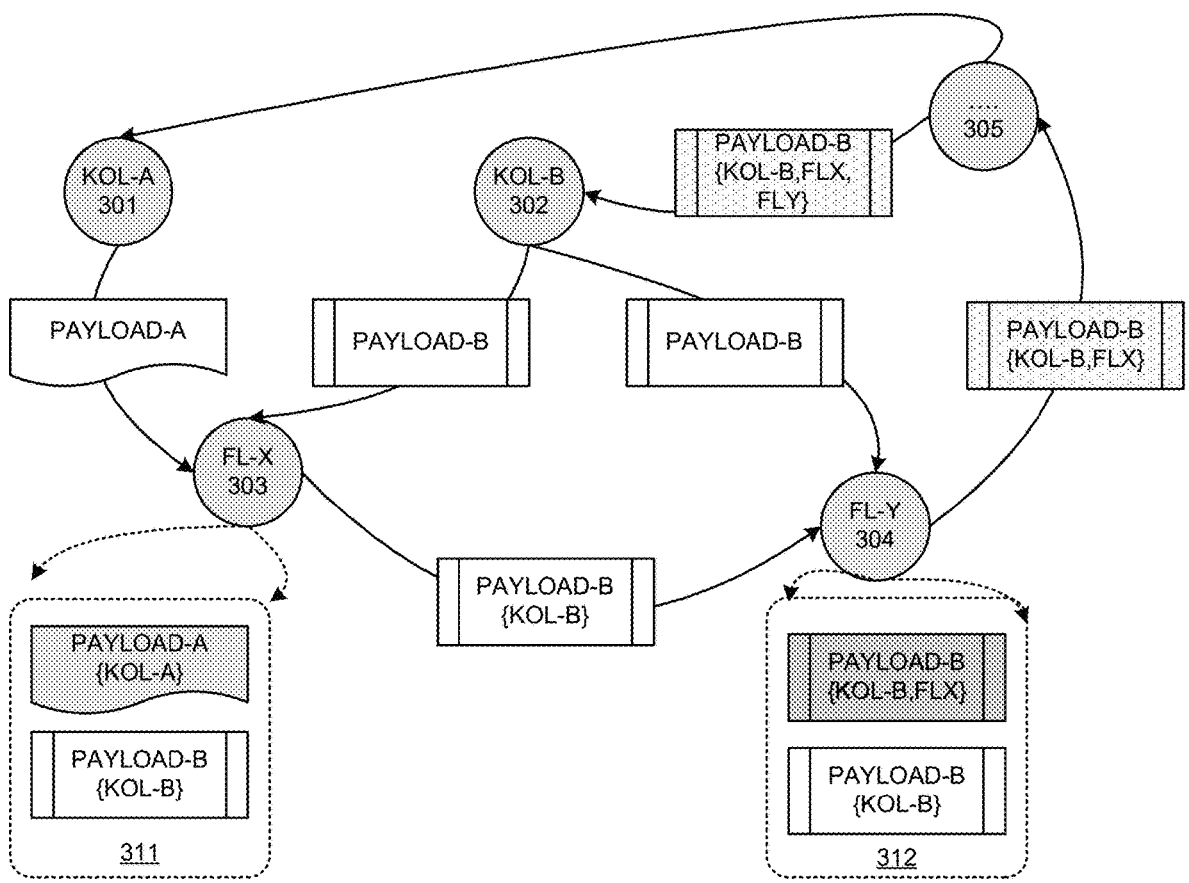
FIG. 3 illustrates exemplary diagrams of a referral tracking process using the blockchain-based referral tracking system in accordance with embodiments of the current invention.

FIG. 3 illustrates exemplary diagrams of a referral tracking process using the blockchain-based referral tracking system in accordance with embodiments of the current invention. An exemplary referral network includes a KOL-A 301, a KOL-B 302, a Follower-x 303, a Follower-Y 304, and exemplary other Followers 305. Follower-x 303 follows KOL-A 301 and KOL-B 302. Follower-Y follows KOL-B 302. KOL-A 301 is engaged in promoting a Payload_A. KOL-A 302 is engaged to promote a Payload_B. Both KOL-A 301 and KOL-B 302 are originator node in a chain of transactions of corresponding UGC. A payload is the UGC that has commercial values such as advertising, product and service promotion, etc. In one embodiment, an AI writing system, such as deep learning model, creates personalized content of Payload_A for KOL-A. Payload A, a UGC, includes one or more actionable items for one or more promotional items. An actionable item in the UGC represents the contents of the UGC that the receiver/reader of the UGC can act upon to access or get to know the promotional items. Exemplary actions are clicking through a direct link to a sales page, opening an embedded program to a promotional page, accessing contact information for promotional items with referral information, buying the product, subscribing the service or any other and any combination of action that the user takes to access or get to know the promotional item. KOL-B 302 pushes the same payload, Payload_B, to indicate the payload is coming from KOL-B 302. Follower-X 303 happens to be follower of both KOL-A 301 and KOL-B 302. The UGCs from KOL-A 301 and KOL-B 302 may have different contents, but the actionable items in the payload are identical. In their social media groups, Follower-X 303 receives payloads from both KOL-A 301 and KOL-B 302, respectively. Follower-X 303 has a social media content 311 includes Payload-A from KOL-A and Payload-B from KOL-B. Follower-X 303 acts on one or more actionable items in the payload from KOL-A as depicted as a shaded object in 311. In one embodiment, a referral reward model is set up based on the UGC transactions following predefined criteria. In this example, KOL-A 301 qualifies for a reward based on Follower-X's acting on payload/UGC directly from KOL-A.

Follower-X 303 also forwards KOL-B's UGC with Payload_B to Follower-Y 304 through her own network. Follower_Y 304 receives two UGCs, one from Follower_X 303 and one from KOL-B 302. Follower_Y 304 acts on the Payload_B forwarded by Follower_X. Follower-Y has a social media content 312, including Payload-B from Follower-X forwarded from KOL-B, and Payload-B from KOL-B directly. In one embodiment, Follower-Y acts on one or more actionable items on the Payload-B from Follower-X forwarded from KOL-B as depicted as a shaded object in 312. Based on the transaction of the UGC in this transaction, both KOL-B 302 and Follower-X 303 qualify for a reward following predefined criteria. In one embodiment, the predefined criteria for reward are configured through a user interface and updated dynamically. In another embodiment, the predefined criteria for reward is generated and updated dynamically using a deep learning model.

The referral activity may be carried out continuously and asynchronously. In such cases, the propagation route of the referral could become cyclical. For example, Follower-Y 304 pushes Payload-B received from Follower-X forwarded by KOL-B to another Follower 305. Follower 305 pushes the received Payload-B received from Follower-Y forwarded Follower-X and KOL-B back to KOL-B 302. The Payload-B/UGC, in this example, comes back to the originator node KOL-B 302. In on embodiment, when the receiving node is the originator node of the UGC transaction, the tracking of the UGC terminates based on the exit condition being met.

In one embodiment, the UGC transactions, including the push to one or more follower nodes and act-on one or more actionable items, are recorded using a recursive push procedure with inputs of a pushing node, a recipient node, and a payload. In one embodiment, two main "transactions" in the referral tracking scheme, namely, push( ) and act_ion( ) are implemented. push( ) is the referral action that one person refers the UGC to another person. Function act_on( ) is when a person enacts on the payload of the UGC, such as buying a product or subscribing a service, etc. Function push( ) is recursive as shown in the following equations:

$$\begin{cases} \text{push}(X, Y, P) = \text{record\_path}(X, Y, P), \text{push}(Y, Z, P) & \text{tail recursion} \\ \text{push}(X, Y, P) = \text{record\_path}(X, Y, P), \text{act\_on}(Y, P) & \text{exit} \\ \text{push}(X, Y, P) = \text{other exit conditions} & \text{exit} \end{cases}$$

Function push(X,Y,P) denotes sender X pushes payload P to recipient Y. Function act_on(Y, P) means recipient Y acts on payload P. The first clause is a tail recursion, meaning, X pushes P to Y but Y does not act on payload P, instead, Y pushes the payload to another person Z. The recursion has several fixed points that become the exit conditions. These exit conditions are the business rules (or business logic) on how the referral is being implemented. For example, the second clause is an exit condition of the recursion whereby when X pushes P to Y, Y acts on the payload P and completes the action. After Y acts on P, Y can also push P to another person, which will be another recursive clause. Further note, a person X can push P to many other people, even in a multiple recursion. However, as any multiple recursions can be reduced to a simple tail recursion, the scheme using the tail recursion is illustrated.

In one embodiment, exit conditions are configured for the tracking module. Upon detecting one or more exit conditions at an ending node, a UGC tuple of transactions from the originator node to the ending node based on the UGC record to a blockchain database upon detecting the one or more exit conditions. The exit conditions are configurable dynamically. In one embodiment, the exit conditions are configured through a user interface taking user updates. In one embodiment, the one or more exit conditions for the recursion are:
1. When the recipient acts on the payload and completes the action, i.e. no further pushing;
2. When the recipient receives the payload is the initiator/originator of the UGC, e.g., the propagation is circulated back to the initiator/originator.
3. When the recipient does not act on or forward to other people, i.e. the recipient is a sink.
4. When the recipient tries to act on the payload but either it has passed its expiry date, or the maximum number of act-on's has been reached. For example, the payload is limited to maximum five redemptions.

Figure 4:
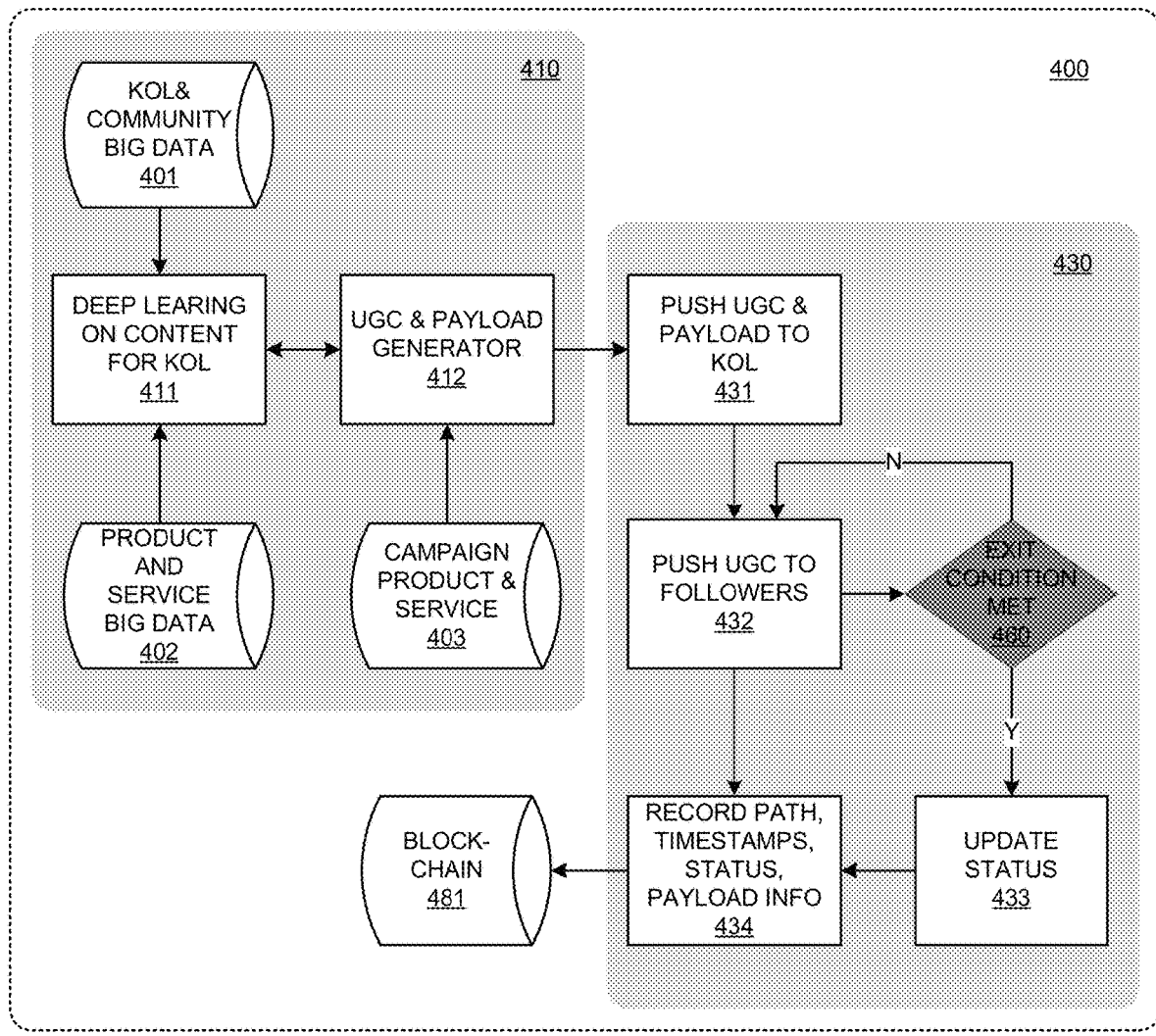
FIG. 4 illustrates exemplary flow diagrams of a referral tracking procedure in accordance with embodiments of the current invention.
Figure 4:
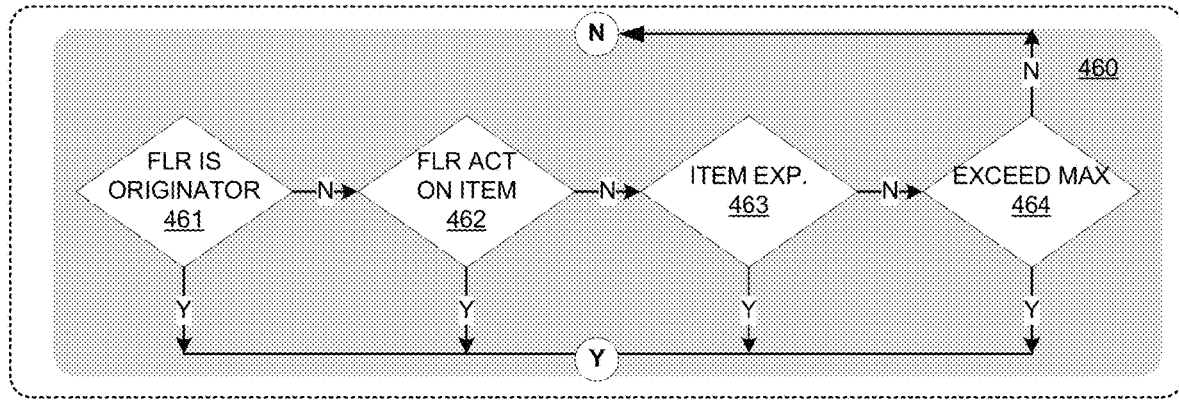

FIG. 4 illustrates exemplary flow diagrams of a referral tracking procedure in accordance with embodiments of the current invention. In one novel aspect, the transactions of a UGC is tracked when it propagates through the social network. The UGC record is updated upon detecting one or more predefined transactions. The UGC tuple of transactions from the originator node to the ending node is added to the database upon detecting one or more tracking exit conditions. A referral tracking procedure 400 includes a UGC generation sub-procedure 410 and a UGC tracking sub-procedure 430. UGC generation sub-procedure 410 includes a deep learning on contents for KOL 411, which is based on a KOL community Big Data 401 and a product and service Big Data 402, and a UGC and payload generator 412, which is based on the marketing campaign for certain products and services 403. UGC tracking sub-procedure 430 includes multiple procedures/process include process 431 of pushing UGC and payload to KOL, process 432 of pushing UGC to followers, process 460 of detecting and determining one or more exit conditions, process 433 of updating status, and process 434 of recording path, timestamps, status, and payload information.

Deep learning on contents for KOL 411 is a deep learning CNN model trained with Big Data on the KOLs and their communities 401 and the product and services 402 that are intended to promote. Deep learning on contents for KOL 411 locates the KOLs and communities that will have the best chance for which products and services. UGC Payload generator procedure 412 consults deep learning module on contents for KOL 411 to identify the KOLs, the communities, and the products and services for each of these KOLs. UGC Payload generator procedure 412 further generates the user-generated contents (UGCs) along with the payload with an AI-based writing system. The results of Process 412 are placed in the KOL's channel for promotion as shown in Process 431. Process 431 pushes the UGC to corresponding KOL followers. The push event will be processed by Process 434, which appends the transaction to Blockchain (240). The push transaction has the path, timestamp, status, and payload information. Process 431 pushes the UGC to the followers. For each follower who has access to the UGC, Process 432 determines if one or more exit conditions are met. If process 460 determines there exists at least one exit condition, the referral tracking for the UGC record is terminated. Process 433 updates the status. Process 434 will append a transaction to Blockchain 481. If process 460 determines there is no exit condition, the UGC record is updated as the UGC propagates further through the social network.

In one embodiment, the referral tracking process determines whether one or more exit conditions are met. Process 460 determines whether there exists any exit condition for the UGC recording. At step 461, the process 400 determines whether the follower/recipient of the UGC is the originator of the UGC. If step 461 determines yes, process 460 determines exit condition exists and exit. If step 461 determines no, it moves to step 461. Step 461 determines if the follower/recipient act on one or more actionable items in the UGC. If step 462 determines yes, process 460 determines the exit condition exists and exit. If step 462 determines no, it moves to step 463. Step 463 determines whether the actionable items has the action timer expired. If step 463 determines yes, process 460 determines the exit condition exists and exit. If step 463 determines no, it moves to step 464. Step 464 determines whether a maximum number of actions has reached for an actionable item. If step 464 determines yes, process 460 determines exit condition exists and exit. If step 464 determines no, process 460 determines no, which means there is no exit condition detected.

In one novel aspect, the blockchain is used to support traceability and transparency for the referral tracking system. Traceability and transparency foster trust among participants. A blockchain is essentially a distributed database of records or public ledger of all transactions or digital events that have been executed and shared among participating parties. Each transaction in the public ledger is verified by the consensus of a majority of the participants in the system. Further, once entered, information cannot be erased.

Figure 5:
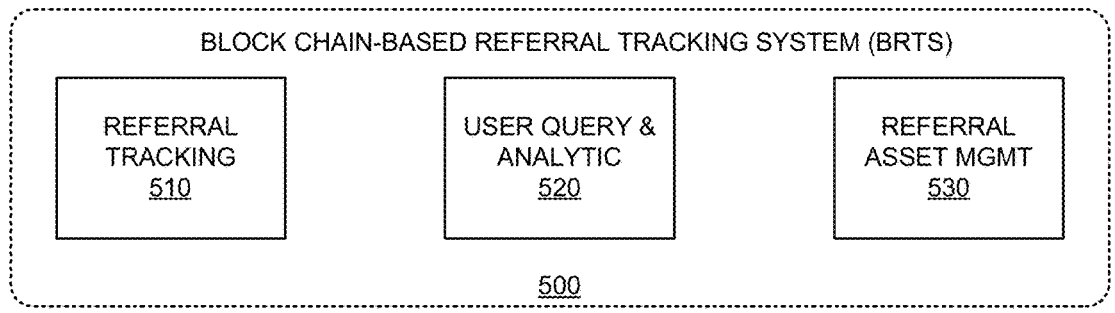
FIG. 5 illustrates an exemplary block diagram of the high-level architecture with blockchain database for the BRTS in accordance with embodiments of the current invention.

FIG. 5 illustrates an exemplary block diagram of the high-level architecture with blockchain database for the BRTS in accordance with embodiments of the current invention. The blockchain-based referral tracking system (BRTS) 500 includes a referral tracking module 510, a user query and analytic module 520, and a referral asset management module 530. Referral tracking module 510 is essentially the entire process described in FIG. 4, starting with the deep learning model to identify KOLs and communities, to generate personalized UGC for the KOLs, and to track the referrals. Module 520 is to support user query and analytic. Users such as KOLs and followers can trace the referral history and pedigree so they can build up the trust of the system. Management can also carry out analytics to assess the referral campaigns and to deter any fraud and anomaly. Module 530 Referral Asset Management is the module that maintains the assets of the entire system that includes, but not limited to, the KOL and follower profiles, the payload details, and so on.

There are basically two types of blockchain, namely, permissionless and permissioned blockchain. Public blockchains such as Bitcoin and Ethereum are permissionless and trustless blockchains. Their consensus algorithms require mining activities. Hence, they need crypto coins or tokens to pay for these mining activities. On the other hand, permissioned blockchains such as Hyperledger, Corda and Quorum do not require coin or token since there are no mining activities. Blockchain comprises two major technologies: the distributed ledger and smart contract. A distributed ledger is a multi-party fully distributed database with no central trusted authority. A hash-based data structure is essential to know that each entry in the ledger is in a certain order and is cryptographically connected to the prior entries. The exact order of those entries is transparent and verifiable by all participants, safeguarding the entries from manipulation or dispute. Therefore, a blockchain is transparent, immutable, and secure. Blockchain is increasingly applied to solve real-world problems because of the transparency, immutability, security, privacy, and disintermediation it provides. To achieve transparency, every transaction on the chain is broadcast to all other users in the network, who validate the transactions. Immutability arises because each block contains the hash of the previous block, preventing any changes to past transactions. Security is achieved through distributed architecture; the transaction history and data stored on the chain is distributed across many nodes in the network, so there is no single point of failure. The new referral tracking system can be implemented in either permissionless or permissioned blockchain, depending on the business model on how to market it and maintain it. To illustrate how a blockchain is used to support the proposed referral tracking system, we use a permissioned blockchain such as Hyperledger to illustrate the process.

Figure 6:
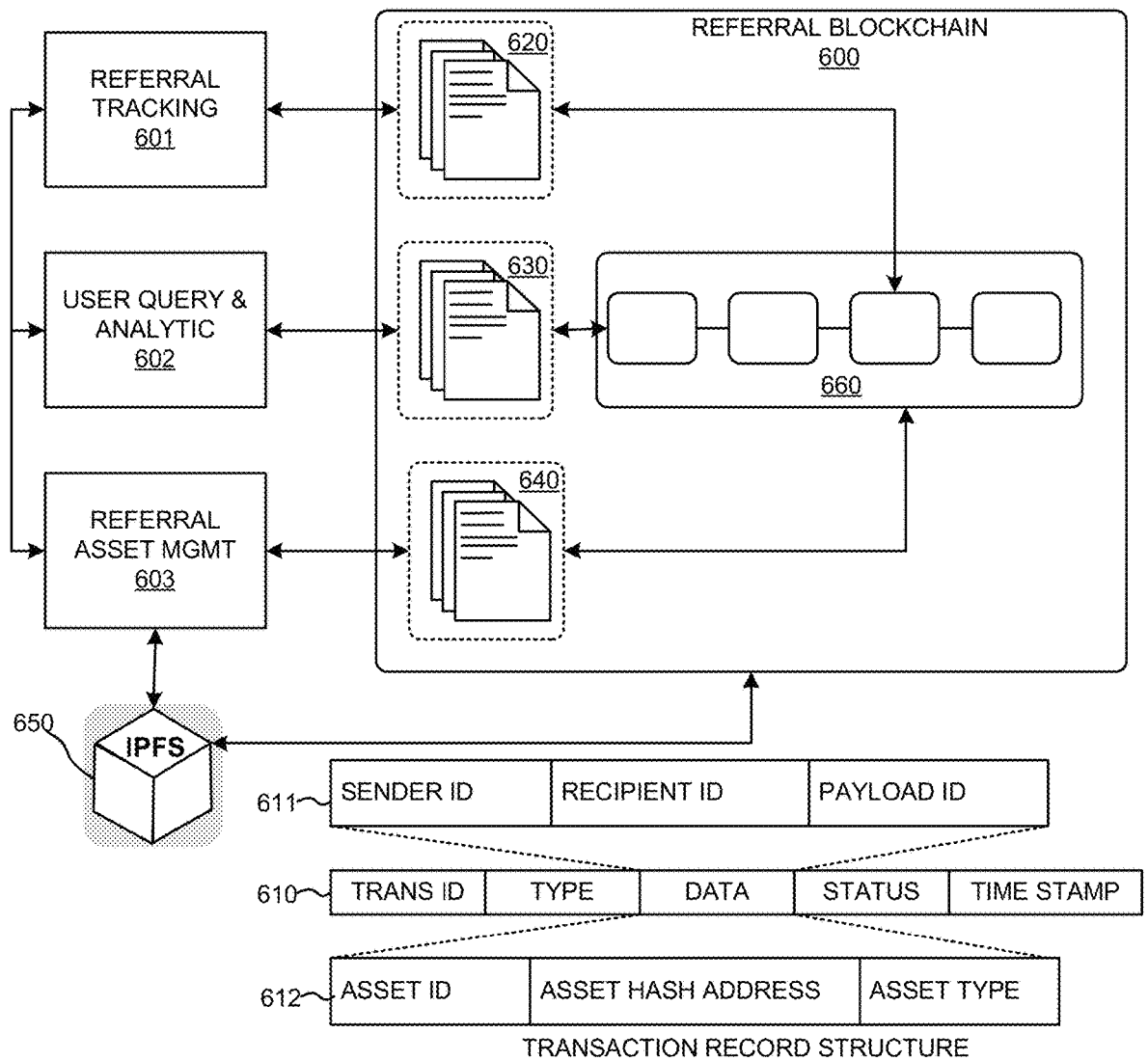
FIG. 6 illustrates exemplary diagrams of a storage system in the BRTS with blockchain distributed ledger and a private IPFS in accordance with embodiments of the current invention.

FIG. 6 illustrates exemplary diagrams of a storage system in the BRTS with blockchain distributed ledger and a private IPFS in accordance with embodiments of the current invention. BRTS uses a referral blockchain database 600 and a private IPFS 650. Transaction data on a blockchain holds simple scalar data. It is not practical for a blockchain to store, for instance, a picture or other BLOBs. To implement an efficient BRTS, Interplanetary File System (IPFS) is adopted. IPFS is a protocol and peer-to-peer network for storing and sharing data in a distributed file system. IPFS uses content-addressing to uniquely identify each file. It offers decentralization and tamper-proof storage with cryptography. In BRTS, the ledger is to maintain the referral history and pedigree of referrals. The blockchain transaction holds the hash addresses of the assets that are stored in IPFS. The bulk information of the participant and payload details are maintained in the IPFS.

The blockchain 600 contains a certain and verifiable record of every single transaction ever made. Smart contract is built upon the distributed ledger, such as distributed ledger 660. Since distributed ledger allows for multiparty and shared use, distributed ledgers can be equipped with multiparty business logic, which is more commonly referred to as 'smart contract'. These are programs written in a language particular to a given type of blockchain. The smart contracts live on the shared network and are able to execute on all participating nodes simultaneously.

The blockchain database 600 has the distributed ledger of the transaction record, as shown in the transaction record Structure 610 and three sets of smart contracts. Conceptually, BRTS could use two blockchains, one for the referral transactions, and a separate blockchain to index onto the assets managed by the IPFS. For instance, the profiles and other information pertinent to KOLs, followers and management staff are stored in the IPFS 650. Similarly, payload details are also stored in the IPFS 650. When an asset file is stored, IPFS 650 returns a unique hash address pointer of the file. IPFS 650 uses content-addressing to generate the hash-pointer address. These addresses become transactions and are stored in the blockchain. Any changes (e.g., update) yield different hash and the asset will be treated as a new one. Alternatively, we can use a single blockchain to record both referral transactions and asset indexing. The latter approach is adopted in the current design. 610 shows the header of a BRTS blockchain transaction, including the transaction ID, the type, the data field, the status, and the time stamp. The Type is either Referral or Asset. The data will be expanded depending on the type to either 611 or 612. If it is Asset type, the data field includes the Asset ID, the asset hash address, and the Asset Type (profiles, payload, etc.). The Asset ID is the "object ID" of the asset, such as the ID for the KOL, the follower or the payload. The Asset ID is created by referral asset management 603 and is unique throughout the BRTS. The asset hash address is essentially the hash address pointer of the asset managed by the IPFS. Any update of the asset will have a new hash address, but the unique asset ID remains unchanged. If it is Referral type, the record is expanded to include sender ID, recipient ID, Payload ID, status and timestamp whereby these IDs are simply the asset ID of the sender, recipient and payload files managed by 603 and IPFS. Status indicates the type of event such as forwarding, act-on and so on. Status in 611 and 612 can be further used as access control (ACL).

Referral Asset Management 603 manages storing and retrieving referral asset files and interfaces with the blockchain. User query and Analytic 602 allows users such as the KOLs, followers and other authorized personnel to interrogate and trace the referral activities. Three modules of smart contract, i.e., 620, 630, and 640 facilitate the modules Referral Tracking 601, User Query & Analytic 602, and Referral Asset Management 603, respectively.

Figure 7:
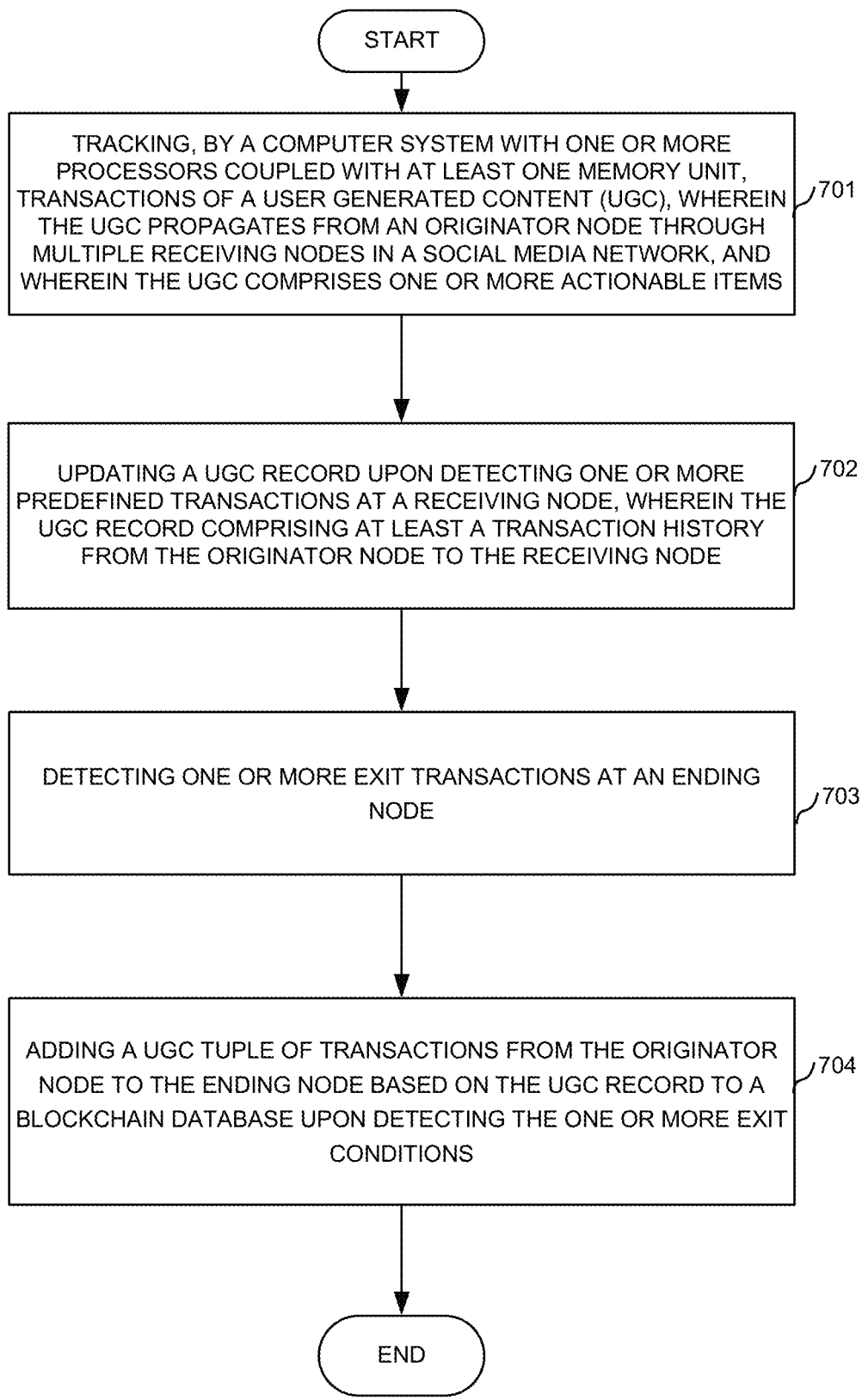
FIG. 7 illustrates an exemplary flow chart for the blockchain-based referral tracking system in accordance with embodiments of the current invention.

FIG. 7 illustrates an exemplary flow chart for the blockchain-based referral tracking system in accordance with embodiments of the current invention. At step 701, the BRTS tracks transactions of a user generated content (UGC), wherein the UGC propagates from an originator node through multiple receiving nodes in a social media network, and wherein the UGC comprises one or more actionable items. At step 702, the BRTS updates a UGC record upon detecting one or more predefined transactions at a receiving node, wherein the UGC record comprising at least a transaction history from the originator node to the receiving node. At step 703, the BRTS detects one or more exit transactions at an ending node. At step 704, the BRTS adds a UGC tuple of transactions from the originator node to the ending node based on the UGC record to a blockchain database upon detecting the one or more exit conditions.

Monetization Based on Dynamic UGC Path

The content creators of UGCs, such as bloggers, YouTubers, KOLs/influencers, LinkedIn members, etc., make money by promoting commercial products and services to their social network connections. Products and services (PP) are promoted to users when one or more PPs embedded in the UGCs are propagated through the social network. The content creator (creator for short) is rightfully getting monetary rewards when he promotes or refers the PPs or other advertisements to his immediate connection ($1^{st}$ degree of connection). The power of social network lies in its connectivity: the PP embedded in the UGC are being propagated from the immediate circle of friends to others, i.e., friends of friends. These "intermediaries" reach out to a much larger population. If their actions result in a sale, only the creator alone gets the monetary rewards, which is the current common practice in the industry. No intermediaries will have any monetary reward whatsoever. The process does not inspire and motivate intermediaries to take part in promoting the PP.

The BRTS-MS system disclosed here provides technical merit to track the UGC propagation path. In one novel aspect, a set of profit-sharing rules is selected for the monetization of the PP embedded in the UGC. A creator creates the UGC embedded with one or more PPs from one or more merchants or advertisers through a products and services data network, or an advertiser network. The BRTS-MS system automatically pushes and monitors referrals of products and services advertisements in a virtual social community and executes a profit-sharing plan.

Figure 8:
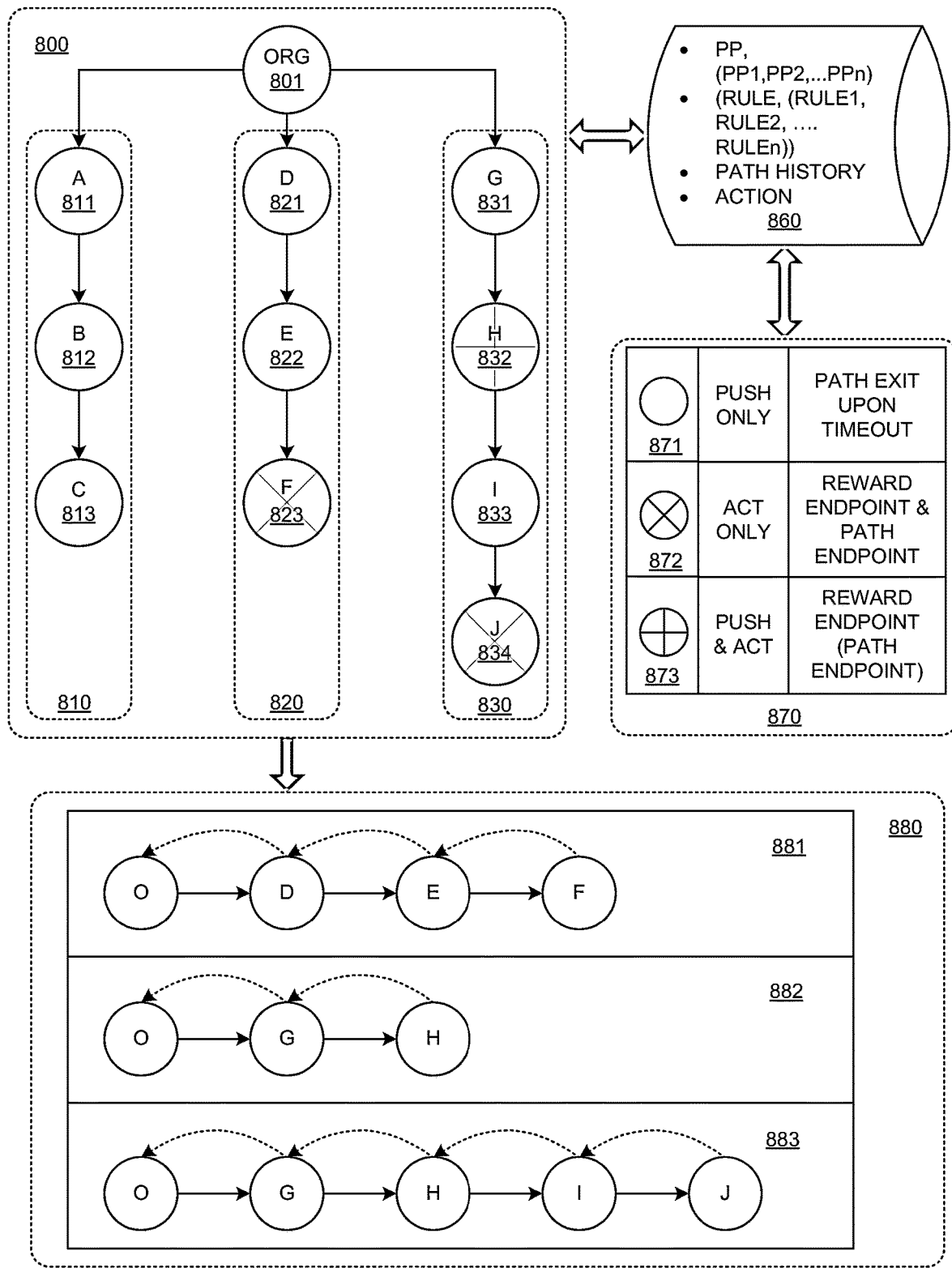
FIG. 8 illustrates exemplary diagrams for a simplified UGC with embedded product and service promotions (PPs) propagating from the originator/creator nodes through multiple nodes and generating one or more reward paths.

FIG. 8 illustrates exemplary diagrams for a simplified UGC embedded with PPs propagating from the originator/creator node through multiple nodes and generating one or more reward paths. An exemplary simplified UGC propagation path 800 includes an originator/creator node 801 and multiple UGC propagation paths, including UGC path 810 with receiving nodes A 811, B 812, C 813, UGC path 820 with receiving nodes D 821, E 822, F 823, and UGB path 830 with receiving nodes G 831, H 832, I 833, and J 834. Originator 801 creates a UGC embedded with one or more PPs from one or more merchants and/or advertisers. In one embodiment, 860 is a part of the data storage in the blockchain. It includes one or more actionable items associated with corresponding PP. In another embodiment, the UGC further includes one or more transaction history links along corresponding one or more UGC propagation paths from the originator node to the receiving node. Optionally, the UGC may include one or more profit-sharing rules. The profit-sharing rules may be generated and updated through a user interface by user inputs. The profit-sharing rules are selected based on the associated PP.

There are basically two types of profit-sharing, namely, fixed fees and variable fees. Fixed fees are the amount of fee the creator desires to share with members when the PP is acted on. These fixed fees include but not limited to the followings: SC $ is the shared commission if the PP is acted on by the member but the member does not push the PP further to his own network. SC+ $ is the shared commission if PP is acted on by the member and the member further pushes the PP to his own network. Ideally, SC+ $ should be greater than SC $. If a member pushes the PP after he acts on it, it is a good validation and a convincing testimony in promoting the PP. Examples of SC $ include but not limited to, sharing commission received from merchants. For example, creator can be an Amazon Associate. If he promotes a product that results with a sale, he gets commission from Amazon. If the creator helps promote a job in LinkedIn that ends up with an application or eventually a hire, he gets a monetary reward from the hiring company. MBA programs or many other school programs need promotions. If the creator refers a program to a friend in his social network that yields an admission application, a referral fee is paid to the creator. In all these cases, the referral fee is known to the creator/originator when the creator/originator signs up with the merchants. To motivate the referral network to promote the PP further, the BRTS-MS system can determine dynamically how much out of these fixed fees received from the merchant to be shared with the person who acts on it. In one embodiment, the BRTS-MS dynamically selects a referral rule based on inputs from the creator/originator. In another embodiment, the BRTS-MS dynamically selects a referral rule based on the inputs from the merchants. In yet another embodiment, the BRTS-MS dynamically selects a referral rule based on feedback of the system, considering one or more factors including the type of PP, the profile of the creator, the history of success rate, etc. Other than SC $, Click $ is also a fixed fee. For example, with Google AdSense, creator receives a fee on each click of a PP. Similarly, to encourage his followers to propagate the PP, the creator can share the click fee he receives through the BRTS-MS. There are other fixed fees depending on the PP and arrangement of the merchants. Variable fees are fees that members will be sharing in promoting the PPs, include but not limited to, sharing commission received from merchants. Variable fees include but not limited to push fee that is a fee shared by members who simply propagate the PP, e.g., pushing the PP to his network. The variable fee sharing makes the current invention unique and different from other profit-sharing schemes. Our method encourages members to propagate the PP to their own network. They will be rewarded from simply promoting the PP. For example, an Amazon Associate creator receives commissions from Amazon. The creator can set aside a certain amount to share with members who help promoting the PP. Since the set aside amount is fixed, the actual sharing depends on the number of members who partake in the promotion. Hence, the fees a pushing member receives depend on the number of members involved in the promotion, i.e., it is variable. Push $ is the variable fees a member receives by sharing with other members in promoting the PP. Push $ is basically a function of the reward path. A reward path is the backward propagation route from an act-on node to the original creator such that members on the path will share the fee. The computation and distribution of the shared fees are triggered when the propagation results in a terminal node, e.g., act-on node. The longer the path, the less Push $ fee each member receives.

Depending on the action at each receiving node, there are different types of receiving nodes 870, including push-only nodes 871, act-only nodes 872, and push-and-act nodes 873. The BRTS-MS offers an efficient way to track profit-sharing for each different nodes with fix fees or variable fees. The push-only nodes, such as 811, 812, 813, 821, 822, 831, and 833, do not make a purchase or a rewardable action on the embedded PP. Push-only nodes also include nodes that do not push the UGC through the network, such as node 813, which do not act on the embedded PP. The push-only node without pushing would terminate the UGC propagation path upon detecting one or more exit conditions, such as time-out without action. The act-only nodes, such as 823 and 834, make at least one purchase or perform at least one rewardable action on the embedded PP without further pushing the UGC through the social network. The purchase-only is an ending node of a UGC propagation path and generates an exit condition for the UGC propagation path, which in turn, generates a reward computation and distribution. The push-and-act nodes, such as node 832, make at least one purchase or perform at least one rewardable action on the embedded PP and push the UGC to one or more nodes. The push-and-act node is an endpoint for the reward path and optionally an endpoint for the UGC path.

As the UGC propagates through the social network, the transactions are recorded in the blockchain. The propagations are done in parallel, and they form one or more reward paths 880, including reward path 881 O-D-E-F, reward path 882 O-G-H, and reward path 883 O-G-H-I-J. In one embodiment, the UGC transactions and/or the reward paths are stored in a blockchain database. The detailed record-keeping and total transparency are crucial to assure trust. All referrals and transactions of products and services are recorded in a blockchain that is immutable, highly secured, and fully transparent.

Figure 9:
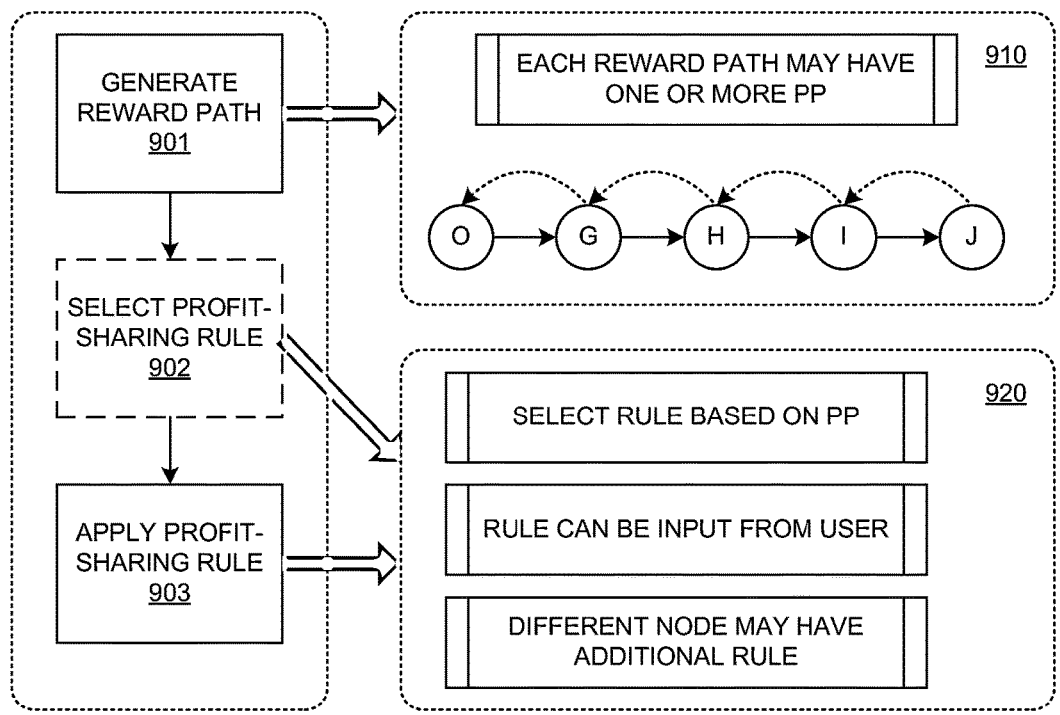
FIG. 9 illustrates exemplary diagrams for generating monetary rewards with UGC based reward path in accordance with embodiments of the current invention.

FIG. 9 illustrates exemplary diagrams for generating monetary rewards with UGC based reward path in accordance with embodiments of the current invention. At step 901, the BRTS-MS system generates reward path 910. One or more reward paths from the originator node to an ending node are derived from the one or more propagation paths upon detecting an exit condition at the ending node. Each reward path may have one or more PPs. A profit-sharing rule is applied for each reward path by backward tracing each generated reward path. Optionally, at step 902, a profit-sharing rule is selected. In one embodiment, a default profit-sharing rule is predefined/preconfigured by the creator. In another embodiment, each PP has a predefined/preconfigured profit-sharing rule associated with it. Optionally, the preconfigured profit-sharing rule is carried in the UGC with the embedded associated PP. At step 903, the profit-sharing rule is applied to each node on the reward path. In one embodiment, the profit-sharing rule 920 is dynamically applied. The rule can be selected based on different PPs. The rule can be selected or updated from creator's inputs. In other embodiments, different node, such as push-and-act nodes, may have additional rules associated with them.

The present invention implements a novel profit-sharing method that rewards all people involved in promoting sales in social network. The method is based on a consumer-to-consumer (C2C) model. The guiding principle of our method is that wealth will be shared with all participants in the shared and sustained value creation, similar to the underlying principle of the Davos Manifesto 2020. The BRTS-MS system offers a flexible and laissez faire propagation scheme. Unlike other profit-sharing programs, which are essentially a tree (hierarchical) organization. The current invention does not assume the tree structure. The referral propagation path can be cyclical. As demonstrated in the parent patent, the recursive referral propagation scheme is guaranteed to be terminated.

Figure 10:
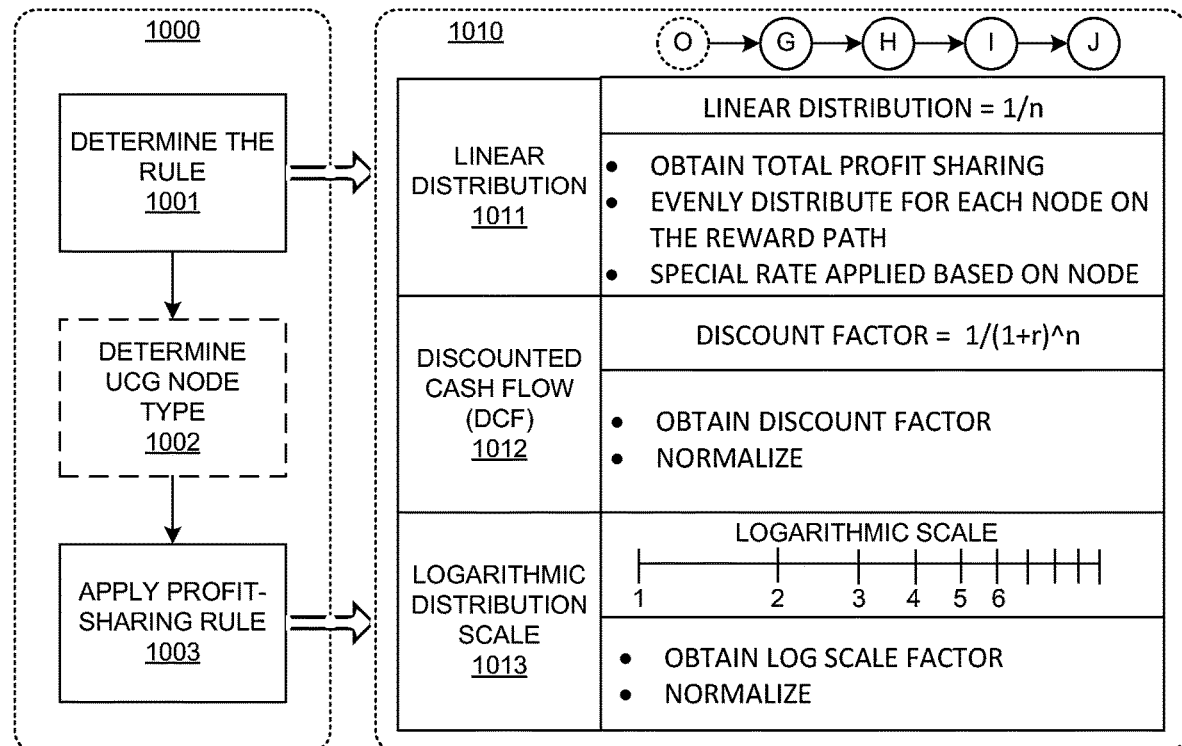
FIG. 10 illustrates exemplary diagrams for a dynamic rule based profit-sharing structure with UGC generated reward path in accordance with embodiments of the current invention.

FIG. 10 illustrates exemplary diagrams for a dynamic rule based profit-sharing structure with UGC generated reward path in accordance with embodiments of the current invention. In one novel aspect, a dynamic profit-sharing rule procedure 1000 is provided. At step 1001, the BRTS-MS system determines a profit-sharing rule. Optionally, at step 1002, additional rules are determined for different nodes, e.g., whether this is an act-only node with the SC $ or a push-and-act node with the SC+$. At step 1003, the profit-sharing rule is applied. Referring to FIG. 8 of the exemplary UGC paths 800 and reward path 880. There are three types of nodes in the push graph. The Push node represents a member who simply pushes the PP to his network. The act-only node is the member who acts on the PP, e.g., purchase, subscribe, etc. The push-and-act node where a member who acts on the PP and pushes it to his followers. Nodes F, H, and J are nodes where members act on the PP. In this example, creator's push of his UGC through the BRTS-MS yields three act-ons. To illustrate how the profit-sharing plan works, let's assume a creator/originator will receive a 4% referral commission for each PP that is acted on. As depicted in FIG. 9, without the profit-sharing plan, creators will receive 4% commission for each of the three act-ons, i.e. nodes F, H, and J. In order to mobilize his social network connection, a profit-sharing plan is dynamically selected for each node of the one or more reward paths. To illustrate how the profit-sharing plan works, let's assume the BRTS-MS is configured with allocating 0.5% and 1% of the referral commission from the merchant to ACT_ONLY node and Push & ACT node, respectively. A total of 0.5% of the referral commission is further shared as push fee with any member who helps push the PP in a reward path. The example shows three paths of propagation. Path 810 (A-B-C) is a path that does not have the PP acted on. Hence, there is no triggering event and members of the path receive no fees. Path 820 (D, E, F) is a path terminated by an act-only node F. It triggers the computation and distribution event. Members of this path will enjoy profit-sharing. Path 830 (G, H, I, J) contains two act-on nodes (H, and J). Members of this path will also enjoy profit-sharing. The act-only nodes receive fixed fee SC $. The push-and-act nodes receive fix fee SC+$. The variable rate fees P$ are shared among the push-only nodes in the reward path. The subscripts of the node labels are the type of fee and the node that the fee is assigned to. For instance, SC $_F refers to the fixed shared commission SC $ of node F, and P $_GJ denotes the push fee P $ of node G triggered by the terminal node J while P $GH is the push fee P $ of node G triggered by the terminal node H. In one embodiment, different rules 1010 are selected for different PP for variable fees, including linear distribution 1011, discounted cash flow-like (DCF) 1012, and logarithmic distribution scale 1013.

The linear distribution rule divides the allocated push fee among each push node equally. Table-1 illustrates an exemplary linear distribution fee structure for reward path 881 and 883 along with the fixed fees sharing.

TABLE 1

Linear Method to distribute Push Fees

| Variable Fees | O-D-E-F Fees | Variable Fees | O-G-H-I-J Fees |
| --- | --- | --- | --- |
| P$_DF | 0.25% | P$_GJ | 0.17% |
| P$_EF | 0.25% | P$_GH | 0.50% |
| Fixed Fees |  | P$_HJ | 0.17% |
| SC$_F | 0.50% | P$_IJ | 0.17% |

| | Fixed Fees | |
| --- | --- | --- |
|  |  | SC + $_H | 1% |
|  |  | SC$_J | 0.50% |
| Total shared commission | 1.00% |  | 2.50% |
| Commission | 4.00% |  | 8.00% |

TABLE 1-continued

Linear Method to distribute Push Fees

| Net Commission | 3.00% | | 5.50% |
|---|---|---|---|
| | | Total Commission for Creator | 8.50% |

Consider the push fees for nodes D and E in (O, D, E, F), i.e., P $_DF and P $_EF. Creator sets aside a total of 0.5% for push fees. Hence nodes D and E will split the fees evenly, i.e., 0.25%. SC $_F gives the member of node F a 0.5%. Hence, for (O, D, E, F), the BRTS-MS shares a totally 1% of the 4% referral commission allocated from the merchant. Similarly, for the two reward paths in (O-G-H-I-J), the fixed fees of SC+ $_H and SC $_J are, 1% and 0.5%, respectively. Push fee P $_GH enjoys the entire 0.5% since G is the only member on the reward path to node H. For the node of reward path (G-H-I-J), nodes G, H and I are entitled to share the 0.5%. Hence each will receive approximately 0.17%. Using this profit-sharing method, the creator/originator will net 8.5% total commission instead of the 12%. The idea is that sharing monetary rewards with the creator's network will inspire and motivate the referral network connections through the BRTS-MS system to promote the PP more rigorously and all members involved will also benefit from it financially. The method is essentially a sharing wealth scheme in a sharing economy. The linear push fee sharing is simple. It does not, however, differentiate member's effort. Ideally, member who is closer to the act-on node should be rewarded more than other members. For example, nodes E and I should receive more push fees than nodes D, H and G. We offer, including but not limited to, a method similar to the discounted cash flow method and a logarithmic method to create the discriminating push fee distribution that favors the node closer to the act-ons.

Discounted cash flow-like rule 1012 obtains a discount factor for each node based on the DCF factor. The discount factors are then normalized to become the reward for each node. The discount factor is determined by the equation:

$$\text{Discount Factor} = \frac{1}{(1+r)^n}$$

whereby r is the discount rate and n, is the distance of the push node to the act-on node. The closer the node to the act-on, the more fee he receives. Hence, the push fee depends on the discount rate and the distance of the push node away from the act-on node. Consider Table 2A and Table 2B that show the computation results based on this discounted method.

TABLE 2A

| DCF-like Push Fee Variable fees | | | |
|---|---|---|---|
| Node | Discount factor | Normalized | Fees |
| O-D-E-F | | | |
| D | 0.907029 | 48.78% | 0.24% |
| E | 0.952381 | 51.22% | 0.26% |

TABLE 2A-continued

| DCF-like Push Fee Variable fees | | | |
|---|---|---|---|
| Node | Discount factor | Normalized | Fees |
| O-G-H-I-J | | | |
| G | 0.863838 | 31.72% | 0.16% |
| H | 0.907029 | 33.31% | 0.17% |
| I | 0.952381 | 34.97% | 0.17% |
| O-G-H | | | |
| G | 0.952381 | 100% | 0.50% |

TABLE 2B

| DCF-like Push Fee Total | | | |
|---|---|---|---|
| Variable Fees | Fees | Variable Fees | |
| P$_DF | 0.24% | P$_GJ | 0.16% |
| P$_EF | 0.26% | P$_GH | 0.50% |
| Fixed Fees | | P$_HJ | 0.17% |
| SC$_F | 0.50% | P$_IJ | 0.17% |
| | | Fixed Fees | |
| | | SC + $_H | 1% |
| | | SC$_J | 0.50% |
| Total shared commission | 1.00% | | 2.50% |
| Commission | 4.00% | | 8.00% |
| Net Commission | 3.00% | | 5.50% |
| | | Total Commission for Creator | 8.50% |

The net commission for the creator remains the same, while push fees for each push node are different. The node that is closer to the act-on node receives higher fees. For example, node E is rewarded more than node D, and so on. The DCF-like method offers a moderate discriminating variable rate based on the distance of the node to the act-on node. The creator can vary the discount rate to distribute the push fees, for example, a lower discount rate will favor the closest node with a higher fee. It differentiates nodes on the reward path better than the linear model but not overwhelmingly biases to the node closest to the act-on node.

In one embodiment, logarithmic distribution scale rule 1013 is used for profit-sharing among nodes of the reward path. The logarithmic scale factor is obtained and normalized for each node on the reward path. Unlike other profit-sharing rules, the node that is the closest to the act-on node is strongly favored. A log scale is the opposite of an exponential scale. Table 3A and Table 3B illustrate how the log scale distribution rule is used to compute the push fees. In this case, the log scale is defined as log_10 (distance from act-on node+1).

TABLE 3A

| Logarithmic Scale for Push Fees Variable fees | | | |
|---|---|---|---|
| Node | Discount factor | Normalized | Fees |
| O-D-E-F | | | |
| D | 0.30103 | 38.69% | 0.19% |
| E | 0.47712 | 61.31% | 0.31% |

TABLE 3A-continued

Logarithmic Scale for Push Fees Variable fees

| Node | Discount factor | Normalized | Fees |
|---|---|---|---|
| | | O-G-H-I-J | |
| G | 0.30103 | 21.81% | 0.11% |
| H | 0.47712 | 34.57% | 0.17% |
| I | 0.60206 | 43.62% | 0.22% |
| | | O-G-H | |
| G | 0.30103 | 100% | 0.50% |

TABLE 3B

Logarithmic Scale for Push Fees Total

| Variable Fees | Fees | Variable Fees | |
|---|---|---|---|
| P$_DF | 0.19% | P$_GJ | 0.11% |
| P$_EF | 0.31% | P$_GH | 0.50% |
| Fixed Fees | | P$_HJ | 0.17% |
| SC$_F | 0.50% | P$_IJ | 0.22% |
| | | Fixed Fees | |
| | | SC + $_H | 1% |
| | | SC$_J | 0.50% |
| Total shared commission | 1.00% | | 2.50% |
| Commission | 4.00% | | 8.00% |
| Net Commission | 3.00% | | 5.50% |
| | | Total Commission for Creator | 8.50% |

Using the logarithmic distribution scale rule, the net commission the creator receives remains the same, but the push fees are much more in favor to a push node that is closest to the act-on nodes, e.g., nodes E and I. Hence, it motivates member to push the PP to the best candidates of his family, fans, and friends with higher chance to act on the PP.

The profit-sharing rule based on PP offers a flexible and laissez faire propagation scheme. The referral propagation path can be cyclical. The recursive referral propagation scheme is guaranteed to be terminated.

Figure 11:
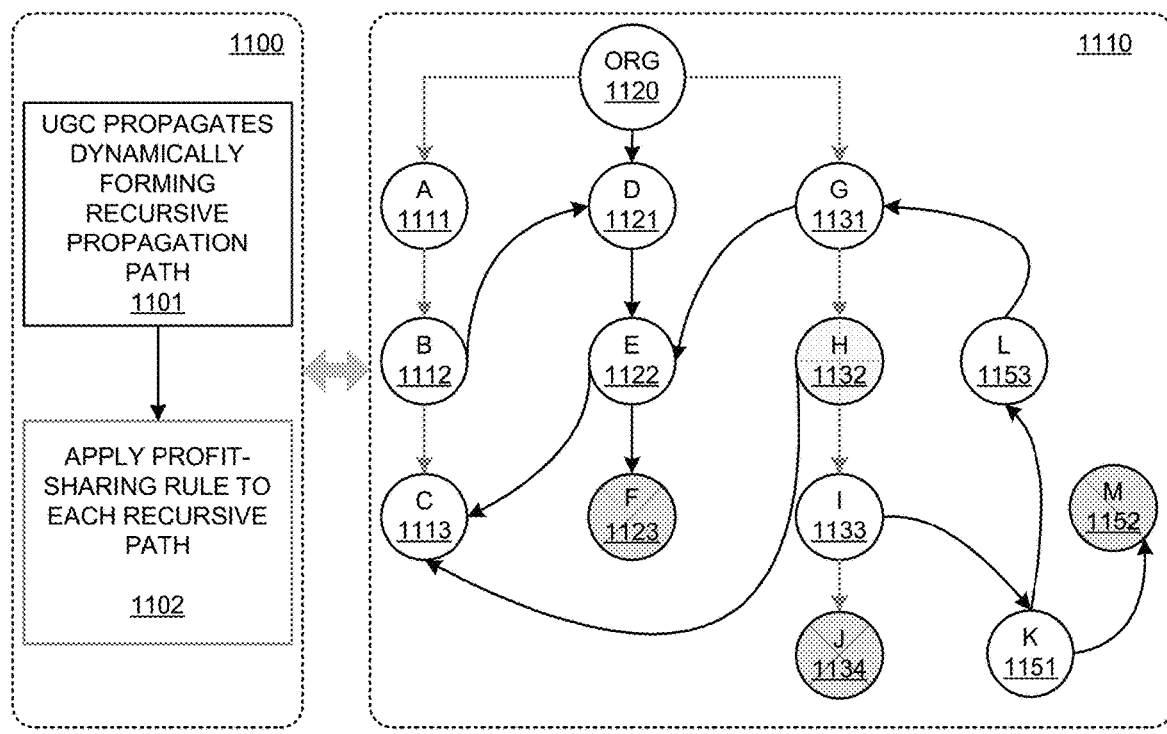
FIG. 11 illustrates exemplary diagrams of a UGC path with recursive propagation tracked by the BRTS-MS system and the dynamic profit-sharing rules being applied in accordance with embodiments of the current invention.

FIG. 11 illustrates exemplary diagrams of a UGC path with recursive propagation tracked by the BRTS-MS system and the dynamic profit-sharing rule being applied in accordance with embodiments of the current invention. The BRTS-MS system applies the dynamic profit-sharing rules to complicated UGC paths, including recursive paths, in the social network. FIG. 8 illustrates a simplified UGC propagation path demonstrating the novel profit-sharing application. The dynamic profit-sharing applies to a more complicated real world UGC propagation path as shown in an exemplary diagram 1110. The originator node, i.e., creator, 1120 creates the UGC embedded with one or more PPs from one or more merchants and/or advertisers. The UGC is pushed through the social network dynamically. Unlike the structure other profit-sharing programs, the UGC paths are formed dynamically and can be different for different UGC. Diagram 1110 shows one propagation graph. Multiple creators in the network can generate the same or different UGCs for the same or different PPs in the social network. Each originator, such as originator 1120, can generate multiple UGCs for the same PPs or different PPs. The originator may generate different propagation paths and is not exclusively confined to a single merchant. In other embodiment, the UGC propagation paths can be fixed with embedded one or more PPs. The UGC propagation path, similar to 800, includes originator 1120, nodes A 1111, B 1112, C 1113, D 1121, E 1122, F 1123, G 1131, H 1132, I 1133, and J 1134. Unlike 800, and more similar to the recursive path in FIG. 3, each node may have multiple connecting nodes, such as G 1132 pushes to H 1132 and E 1122 and etc. New nodes for demonstration purposes include K 1151 receives UGC from I 1133 and pushes to M 1152 that acts on one or more PPS, and L 1153 that pushes back to G 1131. Each node records the action source and forms the reward path based on the recorded action. UGC propagation path procedure 1100 illustrates an exemplary process of applying the dynamic profit-sharing rule to the UGC propagation path. At step 1101, the UGC propagates dynamically, forming a recursive propagation path. At step 1102, the BRTS-MS system applies profit-sharing rule to each recursive path.

Figure 12:
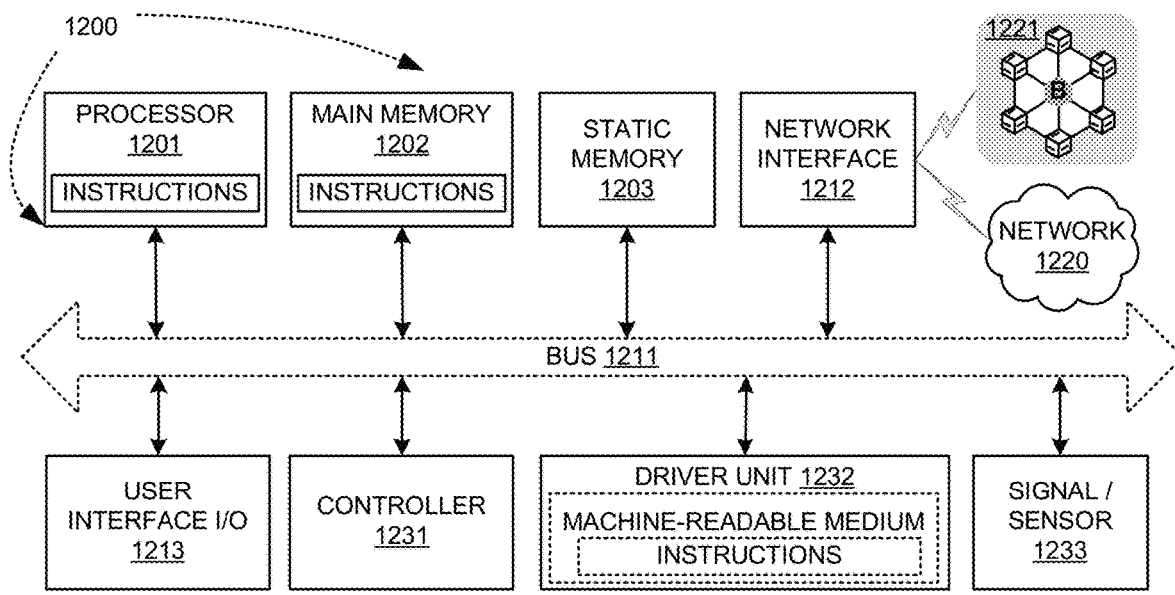
FIG. 12 illustrates exemplary block diagrams of a machine in the form of a computer system performing the referral monetization and UGC path tracking in social network in accordance with embodiments of the current invention.

FIG. 12 illustrates exemplary block diagrams of a machine in the form of a computer system performing the referral monetization and UGC propagation path tracking in social network in accordance with embodiments of the current invention. In one embodiment, apparatus/device 1200 has a set of instructions causing the device to perform any one or more methods for referral monetization in social network. In another embodiment, the device operates as a standalone device or may be connected a network to other devices. Apparatus 1200 in the form of computer system includes one or more processors 1201, a main memory 1202, a static memory unit 1203, which communicates with other components through a bus 1211. Network interface 1212 connects apparatus 1200 to network 1220 and blockchain 1221. Apparatus 1200 further includes user interfaces and I/O component 1213, controller 1231, driver unit 1232, and signal and/or sensor unit 1233. Diver unit 1232 includes a machine-readable medium on which stored one or more sets of instructions and data structures, such as software embodying or utilize by one or more methods for the speech emotion recognition function. The software may also reside entirely or partially within the main memory 1202, the one or more processor 1201 during execution. In one embodiment, the one or more processor 1201 is configured to track transactions of a user generated content (UGC), wherein the UGC propagates from an originator node through multiple receiving nodes forming one or more propagation paths in a social media network, and wherein the UGC comprises at least one product and service promotion (PP) and one or more actionable items associated with corresponding PP, updates a UGC record upon detecting one or more predefined transactions at a receiving node, wherein the UGC record comprising the one or more propagation paths for each PP from the originator node to the receiving node, generates one or more reward paths from the originator node to an ending node derived from the one or more propagation paths upon detecting an exit transaction at the ending node, and applies a profit-sharing rule for each reward path by backward tracing each generated reward path. In one embodiment, software components running the one or more processors 1201 run on different network-connected devices and communicate with each other via predefined network messages. In another embodiment, the functions can be implemented in software, firmware, hardware, or any combinations.

Figure 13:
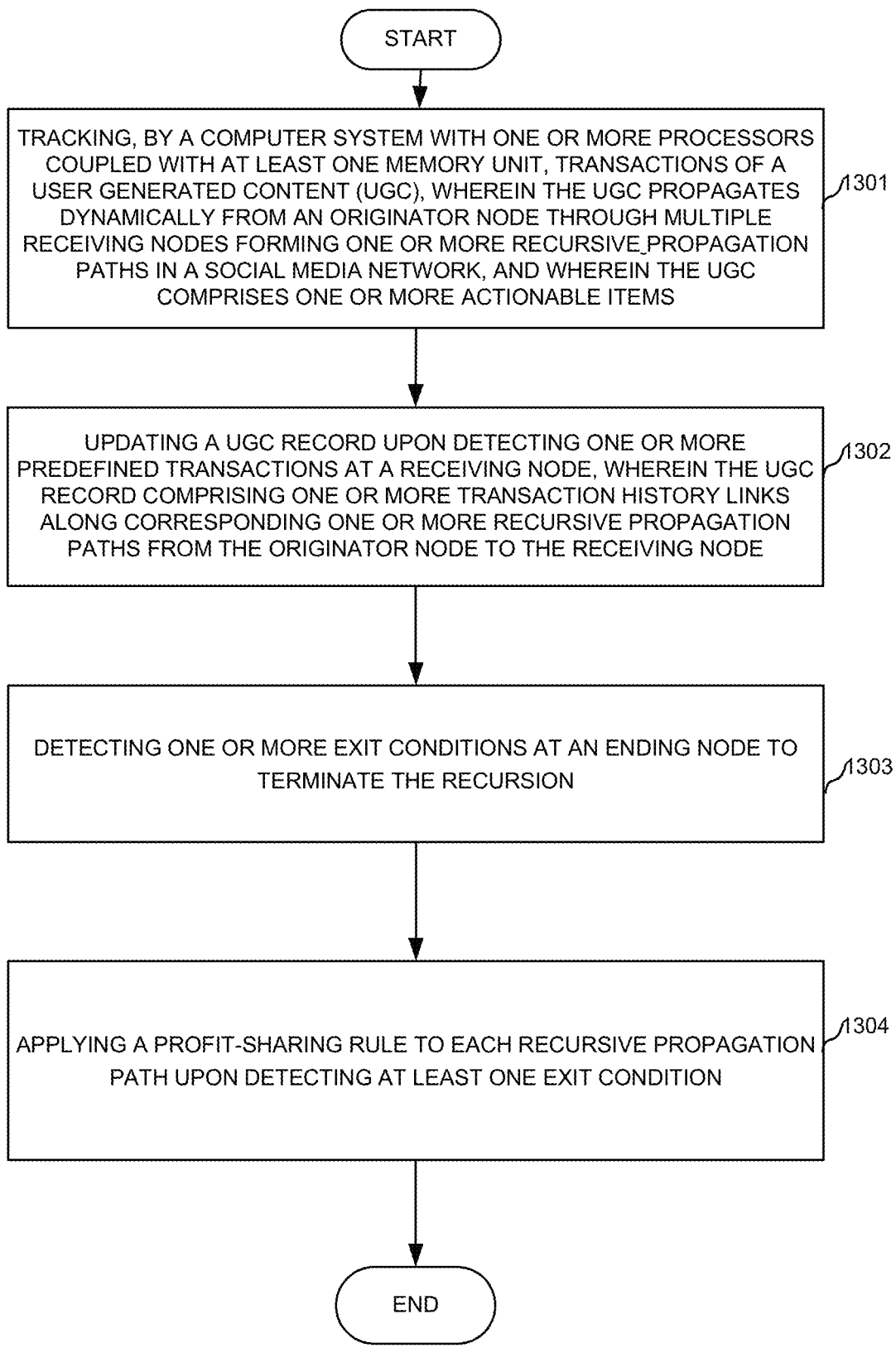
FIG. 13 illustrates an exemplary flow chart for a recursive UGC path applying the dynamic profit-sharing rules in accordance with embodiments of the current invention.

FIG. 13 illustrates an exemplary flow chart for a recursive UGC propagation path applying the dynamic profit-sharing rule in accordance with embodiments of the current invention. At step 1301, the BRTS-MS system tracks transactions of a user generated content (UGC), wherein the UGC propagates dynamically from an originator node through multiple receiving nodes forming one or more recursive propagation paths in a social media network, and wherein the UGC comprises one or more actionable items. At step 1302, the BRTS-MS system updates a UGC record upon detecting one or more predefined transactions at a receiving node, wherein the UGC record comprising one or more transaction history links along corresponding one or more recursive propagation paths from the originator node to the receiving node. At step 1303, the BRTS-MS system detects one or more exit conditions at an ending node to terminate the recursion. At step 1304, the BRTS-MS system applies a profit-sharing rule to each recursive propagation path upon detecting at least one exit condition.

Figure 14:
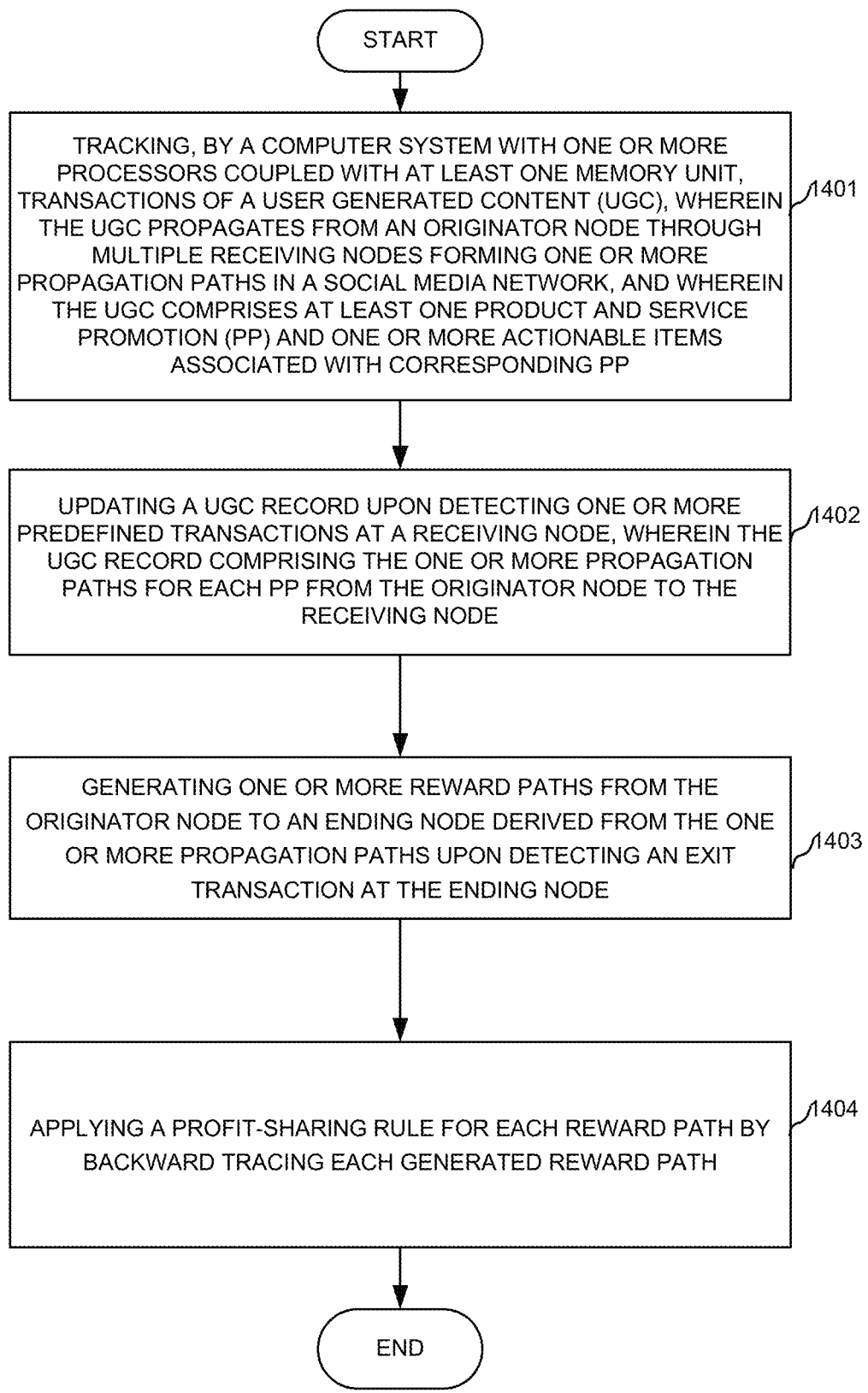
FIG. 14 illustrates an exemplary flow chart for a BRTS-MS system applying the dynamic profit-sharing rules for referral monetization in social network in accordance with embodiments of the current invention.

FIG. 14 illustrates an exemplary flow chart for a BRTS-MS system applying the dynamic profit-sharing rule for referral monetization in social network in accordance with embodiments of the current invention. At step 1401, the BRTS-MS system tracks transactions of a user generated content (UGC), wherein the UGC propagates from an originator node through multiple receiving nodes forming one or more propagation paths in a social media network, and wherein the UGC comprises at least one product and service promotion (PP) and one or more actionable items associated with corresponding PP. At step 1402, the BRTS-MS system updates a UGC record upon detecting one or more predefined transactions at a receiving node, wherein the UGC record comprising the one or more propagation paths for each PP from the originator node to the receiving node. At step 1403, the BRTS-MS system generates one or more reward paths from the originator node to an ending node derived from the one or more propagation paths upon detecting an exit transaction at the ending node. At step 1404, the BRTS-MS system applies a profit-sharing rule for each reward path by backward tracing each generated reward path.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. A method, comprising:
   tracking, by a computer system with one or more processors coupled with at least one memory unit, transactions of a user generated content (UGC), wherein the UGC propagates dynamically from an originator node through multiple receiving nodes forming one or more recursive propagation paths in a social media network, and wherein the UGC comprises one or more actionable items;
   updating, through a recursion, a UGC record upon detecting one or more predefined transactions at a receiving node, wherein the UGC record comprising one or more transaction history links along corresponding one or more recursive propagation paths from the originator node to the receiving node;
   detecting one or more exit conditions at an ending node to terminate the recursion;
   adding a UGC tuple of transactions from the originator node to the ending node based on the UGC record to a blockchain database upon detecting the one or more exit conditions; and
   applying a profit-sharing rule to each recursive propagation path upon detecting at least one exit condition.

2. The method of claim 1, further comprising selecting one or more profile-sharing rules to apply to each recursive propagation path based on contents of the UGC.

3. The method of claim 1, wherein the profit-sharing rule is one selecting from a linear distribution rule, a discounted cash flow-like (DCF) rule, and a logarithmic distribution scale rule.

4. The method of claim 1, wherein the one or more predefined transactions comprise pushing the UGC to one or more receiving nodes, acting on the one or more actionable items, and an expiration of a no-action timer.

5. The method of claim 1, wherein the exit conditions comprise the ending node completing acting on the one or more actionable items, the ending node acting on an expired actional item, a number of times the ending node acting on the one or more actionable items exceeds a predefined maximum action number, no transaction at the ending node upon an expiration of a no-action timer, and the ending node is the originator node.

6. The method of claim 1, wherein the UGC record is updated using a recursive push procedure with inputs of a pushing node, a recipient node, and a payload.

7. A method, comprising:
   tracking, by a computer system with one or more processors coupled with at least one memory unit, transactions of a user generated content (UGC), wherein the UGC propagates from an originator node through multiple receiving nodes forming one or more recursive propagation paths in a social media network, and wherein the UGC comprises at least one product and service promotion (PP) and one or more actionable items associated with corresponding PP:
   updating, through a recursion, a UGC record upon detecting one or more predefined transactions at a receiving node, wherein the UGC record comprising the one or more recursive propagation paths for each PP from the originator node to the receiving node;
   generating one or more reward paths from the originator node to an ending node derived from the one or more recursive propagation paths upon detecting an exit transaction at the ending node; and
   applying a profit-sharing rule for each reward path by backward tracing each generated reward path.

8. The method of claim 7, wherein the profit-sharing rule is one selecting from a linear distribution rule, a discounted cash flow (DCF) rule, and a logarithmic distribution scale rule.

9. The method of claim 7, further comprising: selecting a profit-sharing rule based on an associated PP.

10. The method of claim 9, wherein the profit-sharing rule is generated and updated through a user interface by user inputs.

11. The method of claim 7, wherein the one or more predefined transactions comprise pushing the UGC to one or more receiving nodes, acting on the one or more actionable items, and an expiration of a no-action timer.

12. The method of claim 7, wherein the UGC record is updated using a recursive push procedure with inputs of a pushing node, a recipient node, and a payload.

13. The method of claim 7, further comprising: adding a UGC tuple of transactions from the originator node to the ending node based on the UGC record to a blockchain database upon detecting the one or more exit conditions.

14. A system comprising:
one or more networking interfaces that connects the system with a social media network;
a tracking module that tracks transactions of a user generated content (UGC), wherein the UGC propagates from an originator node through multiple receiving nodes forming one or more recursive propagation paths in a social media network, and wherein the UGC comprises at least one product and service promotion (PP) and one or more actionable items associated with corresponding PP;
a record module that updates, through a recursion, a UGC record upon detecting one or more predefined transactions at a receiving node, wherein the UGC record comprising the one or more recursive propagation paths for each PP from the originator node to the receiving node;
a reward path module that generates one or more reward paths from the originator node to an ending node derived from the one or more propagation paths upon detecting an exit condition at the ending node; and
a rule module that applies a profit-sharing rule for each reward path by backward tracing each generated reward path.

15. The system of claim 14, wherein the profit-sharing rule is one selecting from a linear distribution rule, a discounted cash flow-like (DCF) rule, and a logarithmic distribution scale rule.

16. The system of claim 14, wherein the rule module selects a profit-sharing rule based on an associated PP.

17. The method of claim 1, wherein the one or more predefined transactions comprise pushing the UGC to one or more receiving nodes, acting on the one or more actionable items, and an expiration of a no-action timer.

18. The method of claim 14, wherein the exit conditions comprise the ending node completing acting on the one or more actionable items, the ending node acting on an expired actional item, a number of times the ending node acting on the one or more actionable items exceeds a predefined maximum action number, no transaction at the ending node upon an expiration of a no-action timer, and the ending node is the originator node.

19. The system of claim 14, wherein the UGC propagates from an originator node through multiple receiving nodes dynamically, and wherein the one or more propagation are recursive propagation paths.

* * * * *